US011182646B2

(12) United States Patent
Wang et al.

(10) Patent No.: US 11,182,646 B2
(45) Date of Patent: Nov. 23, 2021

(54) USER-GENERATED VISUAL GUIDE FOR THE CLASSIFICATION OF IMAGES

(71) Applicant: Landing AI, Ugland House (KY)

(72) Inventors: Dongyan Wang, San Jose, CA (US); Gopi Prashanth Gopal, Seattle, WA (US); Andrew Yan-Tak Ng, Los Altos, CA (US); Karthikeyan Thiruppathisamy Nathillvar, Fremont, CA (US); Rustam Hashimov, Menlo Park, CA (US); Pingyang He, Palo Alto, CA (US); Dillon Anthony Laird, San Francisco, CA (US); Yiwen Rong, San Mateo, CA (US); Alejandro Betancourt, Medellin (CO); Sanjeev Satheesh, Mountain View, CA (US); Yu Qing Zhou, Mountain View, CA (US)

(73) Assignee: LANDING AI, Grand Cayman (KY)

( * ) Notice: Subject to any disclaimer, the term of this patent is extended or adjusted under 35 U.S.C. 154(b) by 119 days.

(21) Appl. No.: 16/669,170

(22) Filed: Oct. 30, 2019

(65) Prior Publication Data

US 2021/0097337 A1 Apr. 1, 2021

Related U.S. Application Data

(60) Provisional application No. 62/906,720, filed on Sep. 27, 2019.

(51) Int. Cl.
*G06K 9/62* (2006.01)
*G06N 20/00* (2019.01)
*G06N 5/04* (2006.01)

(52) U.S. Cl.
CPC ......... *G06K 9/6254* (2013.01); *G06K 9/6256* (2013.01); *G06K 9/6262* (2013.01); *G06N 5/04* (2013.01); *G06N 20/00* (2019.01)

(58) Field of Classification Search
CPC .. G06K 9/6254; G06K 9/6262; G06K 9/6256; G06N 20/00; G06N 5/04
(Continued)

(56) References Cited

U.S. PATENT DOCUMENTS

2005/0010553 A1* 1/2005 Liu ................. G06F 16/583
2016/0140425 A1 5/2016 Kulkarni et al.
(Continued)

OTHER PUBLICATIONS

PCT International Search Report and Written Opinion, PCT Application No. PCT/US2020/052299, dated Jan. 13, 2021, 13 pages.

*Primary Examiner* — Juan A Torres
(74) *Attorney, Agent, or Firm* — Fenwick & West LLP

(57) ABSTRACT

A process and a system for creating a visual guide for developing training data for a classification of image, where the training data includes images tagged with labels for the classification of the images. A processor may prompt a user to define a framework for the classification. For an initial set of images within the training data, qualified human classifiers are prompted to locate the images within the framework and to tag the images with labels. The processor determines whether the tagged images have consistent labels, and, if so, the processor adds images to the training data. The processor may add the images by providing a visual guide, the visual guide including tagged images arranged according to their locations within the framework their labels, and prompting human classifiers to tag the additional images with labels for the classification, according to the visual guide.

19 Claims, 10 Drawing Sheets

(58) Field of Classification Search
USPC .......................................................... 382/159
See application file for complete search history.

(56) References Cited

U.S. PATENT DOCUMENTS

| | | |
|---|---|---|
| 2016/0163035 A1 | 6/2016 | Chang et al. |
| 2017/0255686 A1 | 9/2017 | Ross |
| 2017/0357896 A1 | 12/2017 | Tsatsin et al. |
| 2018/0300576 A1 | 10/2018 | Dalyac et al. |
| 2019/0236413 A1* | 8/2019 | Cox ........................ G06K 9/627 |

* cited by examiner

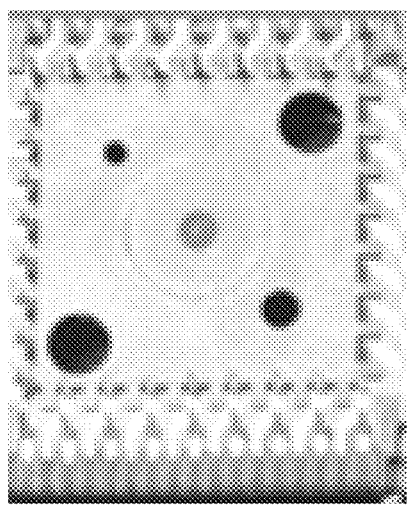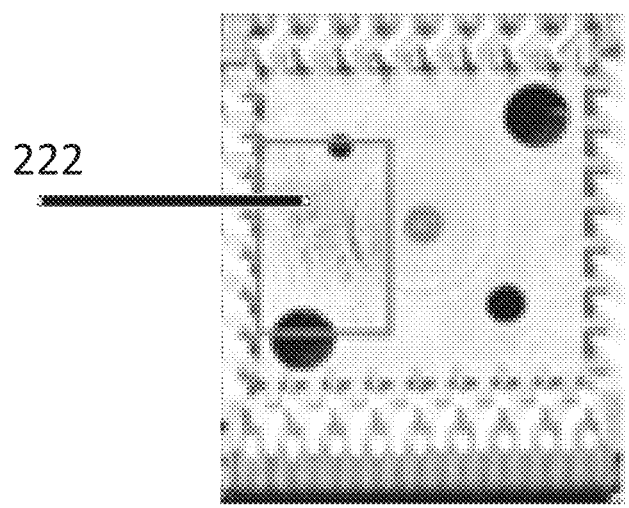
FIG. 2A

| Category | Defects | [Other] | Definition | Image Spectrum |
|---|---|---|---|---|
| Scratch | Shallow | | 1mm depth | |
| | Deep | | >1mm depth | |
| | Sandpaper | | Textured spot, not a single line | |
| Hole | Small Hole | | Consider it as NG any obvious dent, holes in the pin area. The chance of this defect is extremely low | |

| Category | Defects | [Other] | Definition | Image Spectrum |
|---|---|---|---|---|
| Scratch | Shallow | | 1mm depth | |
| | Deep | | >1mm depth | 563, 562, 561 |
| | Sand Paper | | Textured spot, not a single line | |
| Hole | Small Hole | | Consider it as NG any obvious dent, holes in the pin area. The chance of this defect is extremely low | |

| # | PROJECT NAME | DATA SET | IMAGES | INSPECTORS | | | | STATUS | DATE |
|---|---|---|---|---|---|---|---|---|---|
| 1 | 72 PIN SOCKET | Auto Selected | 500 | SM | EL | DP | TK | Completed | March 23, 2019 |

Consistency 610

| | | SM | EL | DP | TK | Consistency |
|---|---|---|---|---|---|---|
| ▶ | Hole | | | | | |
| | otb_1600.png | NG Hole Scratch | OK | OK Hole | OK | 75% | Add |
| | otb_1601.png | NG Hole | OK | NG Hole | NG Hole | 75% | Add |
| | otb_1603.png | OK | NG | NG Hole Scratch | OK | 50% | Add |
| | otb_1604.png | OK | OK Hole | OK Hole | OK | 100% | Add |
| | otb_1605.png | NG Hole | OK | NG Hole | OK | 100% | Add |
| | otb_1606.png | OK | NG Hole Scratch | NG Hole | OK | 100% | Add |
| | otb_1607.png | OK | OK | OK | OK | 100% | Add |
| | otb_1608.png | OK | OK | OK | OK | 100% | Add |

Add to Visual Guide

FIG. 7

| | PROJECT NAME | DATA SET | IMAGES | INSPECTORS | STATUS | DATE |
|---|---|---|---|---|---|---|
| 1 | 72 PIN SOCKET | Auto Selected | 500 | LK EL DP TK | Completed [Result] | 7/24/2019, 1:38:37 PM |
| 2 | 72 PIN SOCKET | Auto Selected | 400 | SM EL DP DP | In Progress | |

700

710 — New Task

720 — Result

FIG. 8

HLP New Task                                                800

Project Name
72 Pin socket

OF IMAGES
Enter how many images you will run

[ Auto Select ]   [ Customize ]   — 810

DATA SET
Please select one of the options below

ASSIGN INSPECTORS            — 820
Please select 2 or 4 inspectors.
Note: If you select 2 inspectors, please select one senior and one junior inspector for accurate result.

(●)   (●)   (●)   (●)
Senior  Junior

[ Cancel ]   [ Create ]

---

700

| PROJECT NAME | DATA S... | ... | STATUS | DATE |
|---|---|---|---|---|
| 1 | 72 PIN SOCKET | Auto Sele... | Completed [Result] | 7/24/2019, 1:38:37 PM |
| 2 | 72 PIN SOCKET | Auto Sele... | In Progress | |

811

[ New Task ]

FIG. 9

Result

| # | PROJECT NAME | DATA SET | IMAGES | INSPECTORS | STATUS | DATE |
|---|---|---|---|---|---|---|
| 1 | 72 PIN SOCKET | Auto Selected | 500 | LK EL DP TK | Completed | 7/24/2019, 1:38:37 PM |

900

910

| Overkill | Escape | Precision | Recall |
|---|---|---|---|
| 0.5 | 0.5 | 0.5 | 0.5 |

USER-GENERATED VISUAL GUIDE FOR THE CLASSIFICATION OF IMAGES

CROSS-REFERENCE TO RELATED APPLICATION(S)

This application claims priority under 35 U.S.C. § 119(e) to U.S. Provisional Patent Application Ser. No. 62/906,720, "User-Generated Visual Guide for the Classification of Images," filed Sep. 27, 2019. The subject matter of all of the foregoing is incorporated herein by reference in its entirety.

BACKGROUND

1. Technical Field

This disclosure relates generally to the creation of visual guides to help in the classification of images, for example in developing training sets for machine learning.

2. Description of Related Art

There are many situations that call for the classification of images. One example is the development of training data for machine learning. In supervised learning, a model is trained using labeled training data. If the samples are images, then the images are tagged with labels that reflect the correct classification for that image. For example, the classification task might be to determine whether a defect exists, and the labels may be OK and NG (no good). As another example, the classification task might be to determine the type of animal in an image, and the labels may be cat, dog, horse, etc.

Continuing with the defect example, manufacturers inspect their products for defects. Manufacturers may use human inspectors to do so. Typically, the manufacturer defines what is a defect and under what conditions a product fails the inspection. This information usually exists as institutional knowledge with human inspectors who then train others to perform the job of visual inspection. However, in many cases there may not be a consistent, clear or even correct definition of defects, particularly since defects are not commonly occurring. This may make the visual inspection results inconsistent, incorrect, time consuming and expensive.

The problem of poorly defined defects is exacerbated when the manufacturer then wants to use artificial intelligence or machine learning to perform the quality inspections. If the training data is deficient, the machine learning model will not be properly trained and will not achieve the expected inspection performance.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 2A shows training data for training a machine learning model, in accordance with one embodiment.

FIG. 4 shows an exemplary user interface of a visual guide, in accordance with one embodiment.

FIG. 5 shows another exemplary user interface of a visual guide including an additional image spectrum for various defects, in accordance with one embodiment.

FIG. 6 shows an exemplary user interface for consensus building among human classifiers, in accordance with one embodiment.

FIG. 7 shows an exemplary user interface for reviewing the progress of a task, in accordance with one embodiment.

FIG. 8 shows an exemplary user interface for creating parameters for a new task, in accordance with one embodiment.

FIG. 9 shows an exemplary user interface including the results of a completed task, in accordance with one embodiment.

DETAILED DESCRIPTION OF THE PREFERRED EMBODIMENTS

Figure 1:
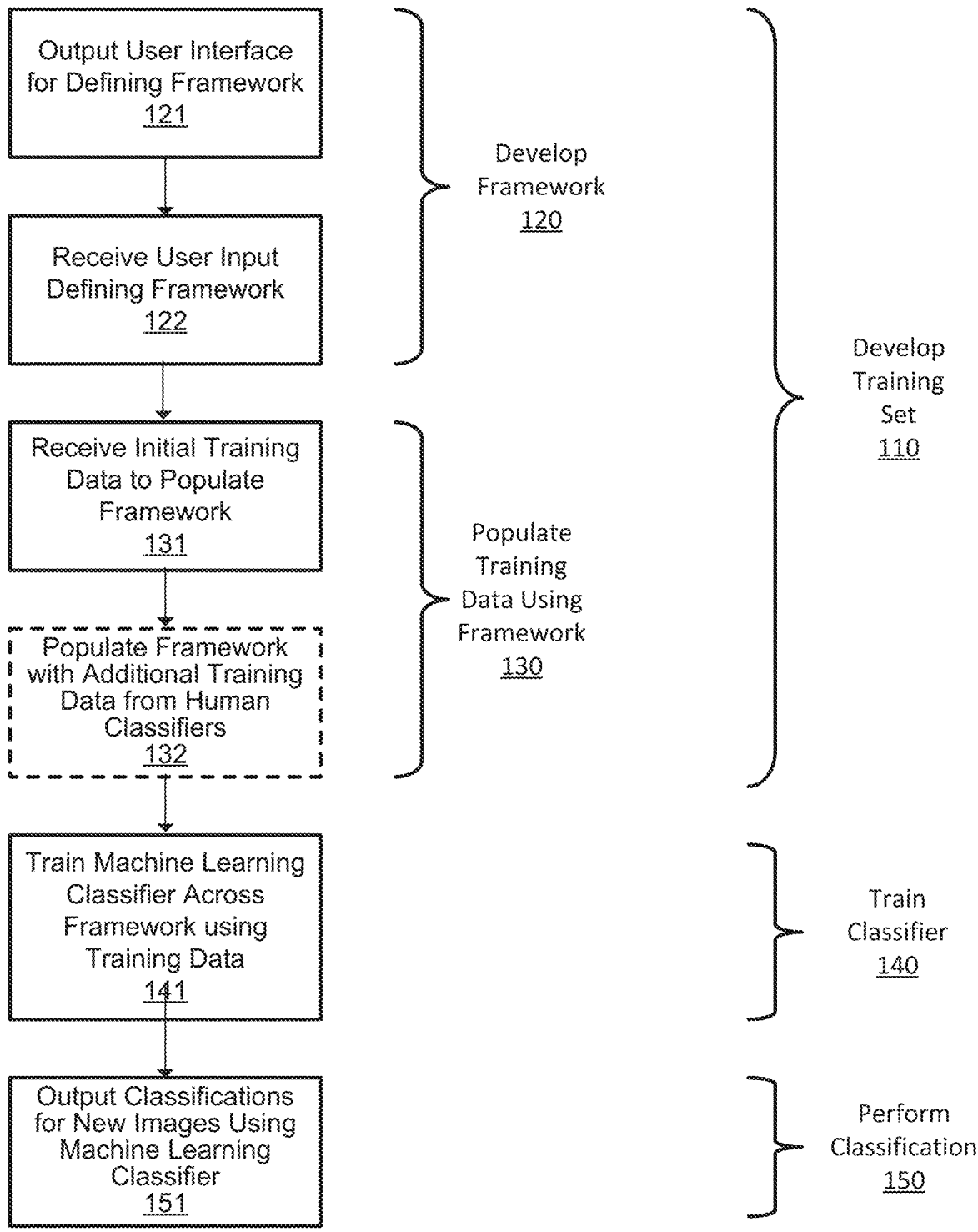
FIG. 1 is a flow diagram for developing a classification system using a machine learning model, in accordance with one embodiment.

A user-generated visual guide provides a consistent framework for the classification of images. Principles will be described in the context of training a machine learning model to classify whether products are defective, but the principles are applicable to tasks other than training machine learning models and to applications other than defect inspection.

Systems and methods are disclosed herein for developing training data for machine learning. The training data includes images that are tagged with labels. The labels are used for classification of the images. For example, the classification may be whether a defect exists, and the labels are OK and NG (no good). As another example, the classification may be the type of animal, and the labels are cat, dog, horse, etc. A label may be used for any type of classification. A user (e.g., an administrator of the visual guide) is asked to define a framework for the classification. The defined framework may relate to different types of defects. For example, the framework may be mammals, fish, and birds. The framework may be hierarchical; for example, mammals may be subdivided into small, medium, large.

In an embodiment, the user (e.g., an administrator) and good ("qualified") human classifiers define a framework and add some good samples (images with good labels) that provide good coverage of the framework. A human classifier may be considered to be good, or qualified, based on statistical data that indicates that the human classifier has an accuracy that is above a threshold level. Together, the good samples provide a visual guide for the classification (or "visual defect guide" in the case of manufacturing defects). This can then be displayed to other classifiers, who tag the remaining images, further improving the visual guide. The visual guide may also be used for other purposes, such as grading the accuracy of classifiers going forward.

To illustrate a particular use case, in defect inspection, the classification task is to determine whether products are OK or NG (no good). A machine learning model is to be trained to do so, using labeled training data that includes images of products tagged with their corresponding labels of OK or NG. An important task is the development of a quality set of training data. Preferably, the training data should include images that are classifiable (i.e., are strongly OK or NG, rather than ambiguous or unclear), that are correctly labelled, and that in the aggregate provide sufficient sampling and coverage over the range of possible images.

A software tool allows the user to develop a visual guide, which may be used to develop such a training set. The user begins by defining a framework for the classification task. For example, the framework may include different types of defects and/or different types of products. The visual guide is then seeded using an initial set of "good quality" images that are tagged with "good quality" labels. These samples are also located within the classification framework. The "good quality" may be achieved using different techniques, some of which are described in more detail below.

When the visual guide has been seeded (initialized), it may be used for various purposes. For example, it may be used as a visual guide to enable less qualified human classifiers to add more training data. It may be used as a benchmark against which to measure the performance of human or AI classifiers. It may also be used to train new human or AI classifiers. It may also be used as a visual specification defining what qualifies as a defect, and identifying areas in the definition that may be somewhat ambiguous. The visual guide may also be improved and/or expanded as more images are classified.

FIG. 1 is a flow diagram for developing a classification system using a machine learning model. Data flow 100 includes three exemplary stages for development and use of the classification system—first, developing 110 a training set; second, training 140 a classifier (e.g., a machine learning model); and third, performing 150 a classification. Developing 110 the training set may be sub-divided into two sub-stages: developing 120 a framework; and populating 130 training data using the framework.

Figure 3:
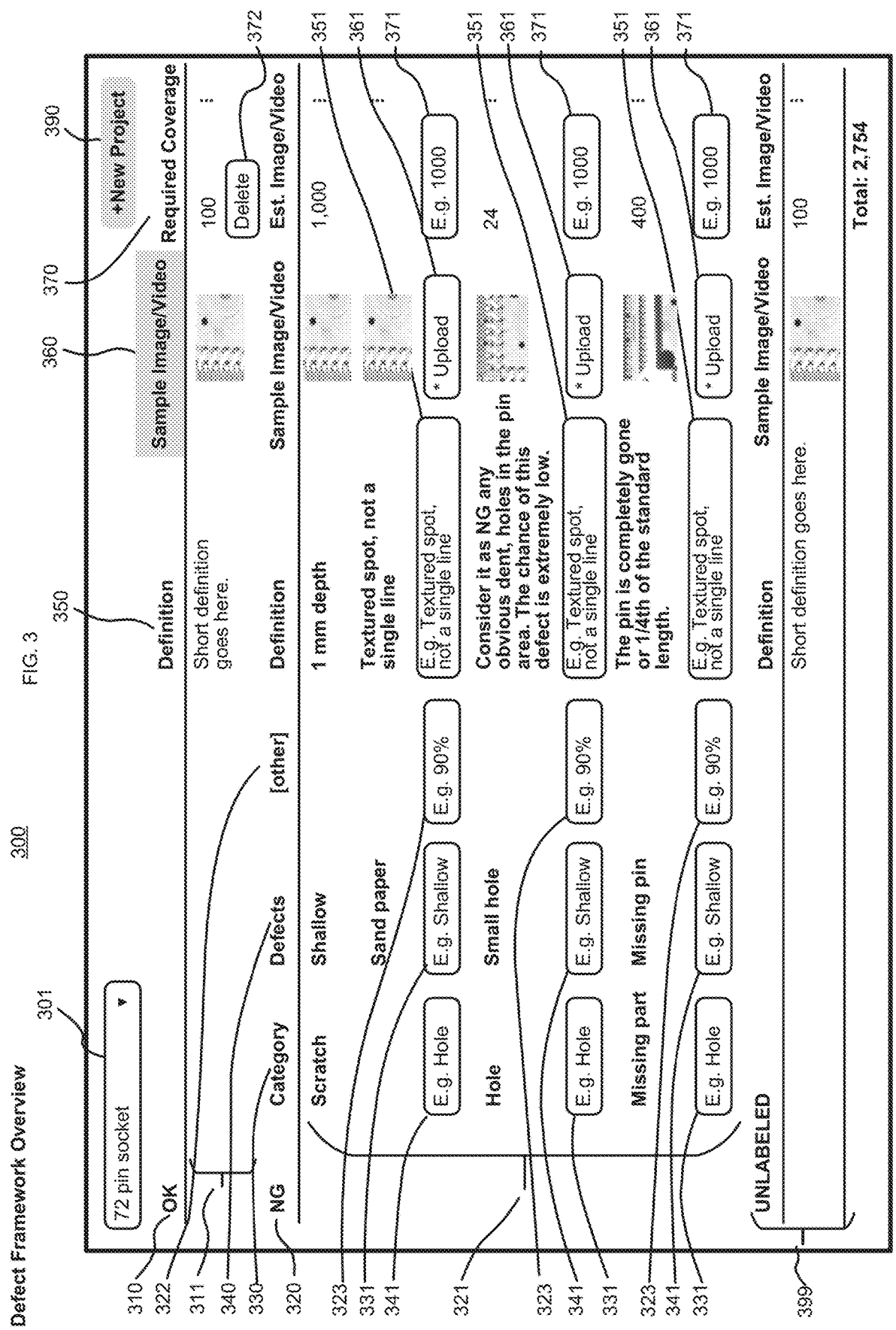
FIG. 3 shows an exemplary user interface for defining the framework, in accordance with one embodiment.

In an embodiment, developing 120 a framework begins with a processor (e.g., of a server) outputting 121 a user interface for defining a framework. An exemplary user interface for defining a framework is depicted in FIG. 3, which is described in further detail below. The outputting 121 of the user interface may occur responsive to the processor detecting a request from a user, such as an administrator, to develop a framework. The processor receives 122 input from the user by way of the user interface, and develops 120 the framework therefrom.

Moving on to populating 130 training data using the framework, the processor receives 131 initial training data to populate the framework. The training data may be received from an administrator, or from a qualified human classifier. In an embodiment, responsive to the framework being developed, the processor prompts the administrator and/or one or more qualified human classifiers to add initial training data. The processor may, from time to time (e.g., periodically, at asynchronous intervals, etc.) prompt the administrator and/or qualified human classifiers to populate initial data until a requisite amount of initial training data is received. The requisite amount of initial training data may be a coverage for each possible classification-label combination. In the example of defects, if the framework indicates three classifications of defects (e.g., scratch, hole, missing part), and the potential labels are NG and OK, then the initial training data may be considered incomplete until each potential label for each type of defect has sufficient coverage in the initial training data. Sufficient coverage refers to a threshold metric of training data for the framework. For example, coverage across the framework may be measured in terms of an amount of data for each classification-label combination type. As another example, coverage across the framework may be measured in terms of diversity of coverage (e.g., training data that corresponds to many different types of defects). Where the training data covers a continuous space, rather than a framework including discrete classification-label types, coverage may be measured as a density of training data given data points. For example, if a defect is a scratch that could be from 1 mm-10 mm long in a 72 pin socket, the coverage may be measured in terms of density across the 1 mm-10 mm values. Sufficient coverage may be measured in terms of a threshold amount or density being satisfied. As will be described below with respect to FIG. 3, the administrator may define a level of sufficient coverage. Alternatively, the processor may determine the level of sufficient coverage based on, e.g., default values, or based on sufficient coverage levels input by administrators in related frameworks. Coverage is further described below with respect to FIG. 2B.

Optionally, populating 130 the training data using the framework may include populating 132 the framework with additional training data from human classifiers. This may include qualified human classifiers, in scenarios where only the administrator populated 131 initial training data. This may also include unqualified human classifiers. Where human classifiers are involved, the processor outputs a visual guide to the human classifiers showing exemplary classification-label combinations based on the developed framework. Exemplary visual guides are shown in FIGS. 4 and 5, and are described in further detail with respect to those figures below. Where unqualified human classifiers are involved, the processor may perform a consistency analysis on labels input by the unqualified human classifiers prior to populating the framework with additional training data from those human classifiers, as will be described in further detail with respect to FIG. 6 below. Discussion of how the processor assigns tasks to populate additional training data is described in further detail with respect to FIG. 7 below.

As one example, training 140 a classifier to automatically tag images with labels includes training 141 the machine learning classifier across the framework using the populated training data. After the classifier is trained, the processor performs 150 the classification by outputting 151 classifications for new images using the machine learning classifier.

FIG. 2A shows training data for training a machine learning model. Two images are included, each of which is tagged with a label. The example in FIG. 2A is specific to a scenario of defects in an article of manufacture (in this case, a 72 pin socket for an integrated circuit), where the two possible labels for the classification are OK or NG. Image 210 is of an article of manufacture that does not have a defect. Because the article of manufacture does not have a defect, the image is tagged with the label 211 of OK. Image 220 is of an article of manufacture that does have a defect—specifically, sandpaper scratch 222 indicated in the framework as being a defect (described with respect to FIG. 3 below). Thus, the image is tagged with label 221 of NG. Labels 211 and 221 may have been input by a human classifier. These images may be used to train 141 the classifier to automatically determine whether to tag an image of a 72 pin socket with a label of OK or NG, depending on whether a sandpaper scratch is detected. Images for any classification may be used in a similar manner to train the classifier to tag images with appropriate labels for a given classification.

Figure 2B:
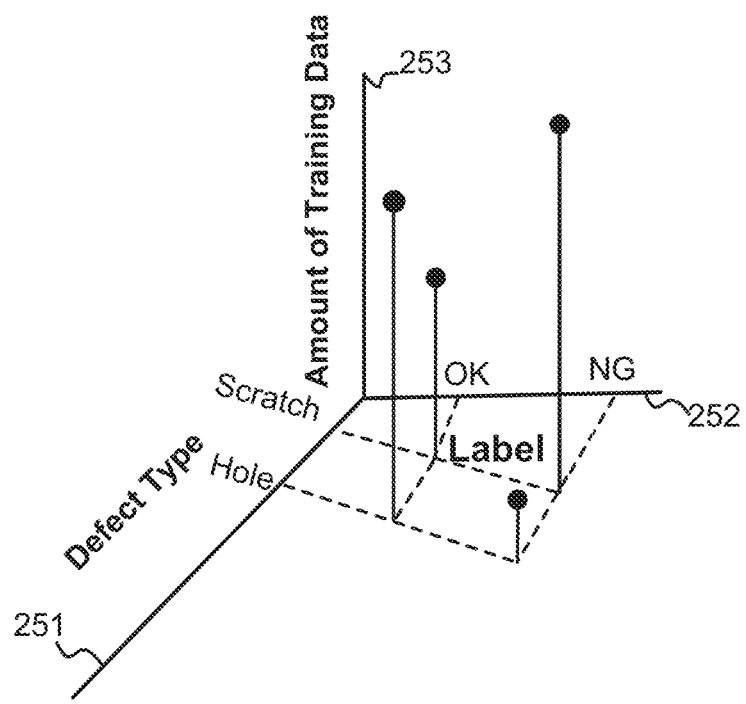
FIG. 2B shows coverage of a framework provided by training data, in accordance with one embodiment.

FIG. 2B shows coverage of a framework provided by training data. Coverage graph 250 is a three dimensional graph, where the x-axis 251 indicates different defect types, the y-axis 252 indicates different label values, and the z-axis 253 indicates an amount of training data. While coverage graph 250 is depicted with respect to defect types that may have binary labels, this is merely exemplary, and any classification may be included on x-axis 251, with any number of possible labels for each classification indicated on y-axis 252. Coverage graph 250 may be generated, by the processor, for display to an administrator of a framework to depict, at a given time, a coverage level for each classification-label combination. As depicted in coverage graph 250, quite a bit of training data has been uploaded for holes with OK labels, and scratches with NG labels. Comparatively, only a small amount of training data has been uploaded for holes with NG labels. Thus, an administrator may determine that there is poor coverage for training data of images of holes with NG labels. The processor may determine whether coverage is poor or good (or somewhere in between) based on coverage parameters input by a user when defining the framework (to be described below with respect to FIG. 3). Coverage graph 250 reflects discrete classification-label values, but this is merely exemplary; as described above, the x-y space could be any parameterization of the defect space that is useful. For example, it could be depth of scratch or length of scratch, e.g., across continuous values. The z-axis is described in terms of amounts for illustrative purposes, but may instead measure density.

FIG. 3 shows an exemplary user interface for defining the framework. User interface 300 that may be output, by the processor, for display to a user, such as an administrator. The framework that is defined using user interface 300 may be with respect to an object as selected using object selection tool 301. As depicted, object selection tool 301 is used to select a 72 pin socket. Also as depicted, object selection tool 301 may be a drop-down menu, from which objects may be selected, and responsive to detecting such a selection, the processor would populate user interface 300 with a corresponding existing framework. Object selection tool 301 may be any means of selecting an object having a corresponding existing framework, above and beyond a drop-down menu. Moreover, object selection tool 301 may include an option for inputting a new object for which a framework is not yet defined, in which case the processor may populate a blank or template framework in user interface 300, through which the user may define the framework for that object. Objects selectable using object selection tool 301 may correspond to a given project; a user may launch a new project to populate different frameworks for objects by selecting new project icon 390. In an embodiment, object selection tool may enable a user to select multiple types of objects for a single framework.

User interface 300 may include a section for defining attributes of the object that would dictate whether to tag an image of the object with a given label. As depicted, two possible labels are indicated for the object—label 310, which is a label of "OK," and label 320, which is a label of "NG." As discussed above, user interface 300 may include any number of labels, as defined by the user, with corresponding sections for defining those labels consistent with section 311 for defining the framework for the "OK" label and section 321 for defining the framework for the "NG" label. A section 399 may additionally be added to describe images that are not yet labeled.

Definition column 350 is a column where a user may define a corresponding classification. For example, a classification corresponding to a defect not existing (and thus corresponding to OK label 310), may be defined to be an image of a 72 pin socket that is not scratched, does not have deformed hole, and is not missing any parts. The user may input the text of a definition using definition interface 351, which as depicted, is a text entry field with sample text for the type of information that may be input. Various definitions of different types of defects that, if detected by a classifier, would result in an application of NG label 320, are also depicted in definition column 350, such as a scratch having a depth of 1 mm, or a textured spot that is a scratch that is not a single line.

Sample column 360 may include one or more images (e.g., a spectrum of images, as will be described in further detail with respect to FIG. 4), or one or more videos, that show an example image corresponding to that definition. Upload icon 361 may be selected in a given row. Responsive to detecting selection of upload icon 361, the processor may prompt the user to select one or more images or videos to upload for inclusion in that given row.

Required coverage row 370 includes an estimate of the user of how many images or videos are needed, e.g., to train a machine learning model to accurately classify new images. For example, because images that are not defective are relatively homogenous, a low number, such as 100, images may be sufficient. Because shallow scratches come in many forms and sizes, however, the user may estimate that 1000 images will be needed to train the machine learning model. The user may input the required coverage using required coverage interface 371, which, when selected, causes the processor to enable the user to input an amount of required coverage. Delete icon 372 enables the user to delete a given estimation. While delete icon 372 is only depicted with respect to required coverage column 370, the processor may include delete icons or options in any other column of user interface 300, and may apply a delete option to an entire row.

Turning now to section 321, category column 330 describes various categories corresponding to label 320 (in this case, categories corresponding to a defective 72 pin socket). The user inputs these categories using category interface 331, where the user may input a name of a category, such as "scratch," "hole," or "missing part." Sub-category column 340 may be used to define sub-categories of a given category. The framework may be hierarchical, including sub-categories. For example, the category "scratch" may include scratches that are shallow, and scratches that are caused by sand paper. The user may enter these sub-categories using sub-category interface 341. In an embodiment, rather than having discrete categories and/or sub-categories, the framework may include continuous values (e.g., a scratch with 0-0.9 mm depth, a scratch with 0.9 mm-1 mm depth, etc.). The user may customize each column, or define new columns. For example, the user may define other column 322 in any manner desired, and may include information using other interface 323.

FIG. 4 shows an exemplary user interface of a visual guide. Visual guide 400 may include a part, of, or a whole, of a framework defined by a user through user interface 300. As depicted in FIG. 4, visual guide 400 includes a visual guide describing two categories of defects—scratches and holes—in a 72 pin socket. The columns relating to category, defects, and definitions are described with respect to FIG. 3, and will not be repeated here for brevity. As described with respect to FIG. 3, rather than defining a single sample image in sample column 360, a spectrum of images may be defined by the user for each given defect. As used herein, the term spectrum refers to a set of two or more images, each having an associated label, that are meant to visually show examples of different variations of an object to provide a more complete view to classification of an object. FIG. 4 depicts, in image spectrum column 460, spectra where there are two images in the displayed spectrum—e.g., one for a classification of "OK," and one for a classification of "NG." As can be seen, for example, for a deep scratch, the "OK" image shows no scratch, whereas the "NG" image shows a deep scratch. A given spectrum need not always display one classification of "OK" and one of "NG"—as shown for the sandpaper defect, the spectrum shows two different images with an "OK" classification.

There are scenarios where a two-image spectrum is not sufficient, in that variations of a characteristic of an object, such as length or depth of a scratch, may benefit from the use of multiple images to aid a classifier to appropriately label the image of the object. FIG. 5 shows another exemplary user interface of a visual guide including an additional image spectrum for various defects. Visual guide 500 includes visual spectrum guide 560, which may include multi-image spectra for some of the defect types. Focusing again on the defect of a deep scratch, image 561 shows an image of a 72 pin socket with no scratch, image 562 shows an image of a 72 pin socket with a small scratch, and image 563 shows an image of a 72 pin socket with a large scratch. If a classifier, such as a machine learned model, was provided only with images 561 and 563 as training data for what should be labeled OK and NG, respectively, then the machine learned model might label a new image resembling image 562 as NG, despite it being OK, because image 562 most closely matches image 563. However, because image 562 is depicted as part of the spectrum with an OK label, a new image that more closely resembles image 562 than image 563 would likely be tagged with an OK label by a classifier, notwithstanding that the new image includes a scratch. Thus, enabling the user to define a spectrum of images using user interface 300 improves the accuracy of labels applied by both human and machine learning classifiers.

In an embodiment, a processor may automatically place a new image on a spectrum. The processor may receive a new image, and may determine that the new image has similar content to two consecutive images spanning the spectrum. The processor may determine that the differences between the new image and each of the two images merit placement between the two images on the spectrum. For example, where a sandpaper defect for a 72 pin socket is defined as being 5 mm wide or wider, the processor may determine that a new image has a sandpaper defect of 5.2 mm, and may place the sandpaper image on the spectrum between two images that have labels of NG due to 5.1 mm and 5.3 mm sandpaper defects.

In an embodiment, as the visual guide incorporates new images, the visual guide may hit a maximum capacity of images for a given classification, or a sufficient capacity of images for a given classification. The visual guide may, responsive to reaching capacity, discard older images to accommodate newer images, or to accommodate images that improve coverage by improving the amount of the framework covered. Rather than discarding old images responsive to reaching capacity, the visual guide may replace old images with new images responsive to the old images reaching a threshold age. The threshold age may be defined by default, or by the user.

FIG. 6 shows an exemplary user interface for consensus building among human classifiers. Consistency interface 600 depicts, for a project 601 with a certain number of images 602 assigned to certain human classifiers 603 for classification, a consistency analysis of labels that each human classifier applied to each image. A user (e.g., the administrator who defined the framework using user interface 300) may select a particular feature using feature selection tool 610 (as depicted, the feature of "hole" was selected). Consistency 620 may be determined based on a percentage of labels applied by classifiers that are consistent for each image. For image 611, a consistency of 75% is determined because three of the four assigned inspectors assigned a label of "OK" to the image. As shown with respect to image 612, the processor determines that each inspector tagged image 612 with a label of "OK", and thus the processor determines that the inspectors were 100% consistent in tagging the image. Optionally, the information for a given image may indicate multiple tags applied to the image by an inspector (e.g., for image 611, inspector SM tagged the image as including both a hole and scratch defect). The percentage consistency calculated may be logged as a consistency score for the image.

Consistency interface includes, for each image, a selectable add option 630 to add the image to the visual guide. In an embodiment, the processor may populate add option for a given image responsive to determining that the image has at least a threshold consistency amount (e.g., 90%, or 100%). The threshold may be a default amount (e.g., 100%), or may be assigned by the user. Thus, rather than including add option 630 for all images, add option 630 may be populated by the processor where inspectors were consistent in their application of a label. The processor may, where consistency is below the threshold consistency amount, prompt further inspectors to tag the image. After processing by the further inspectors, the processor may determine once again whether the tags are consistent. Responsive to determining that the image still does not have a threshold consistency, the processor may discard the image, or may prompt an expert classifier to classify the image. Moreover, rather than prompting further inspectors, the processor may determine whether the consistency is below a low consistency threshold (e.g., below 25% or 50%), in which case the processor may discard the image.

Where an image has low consistency, the processor may apply an image analysis tool to determine aspects of the image. For example, the processor may determine that the image is being taken in poor lighting, that the image has poor contrast, that the image is taken from a viewpoint that does not capture an aspect of the object that corresponds with a task, and the like. Responsive to detecting a condition, the processor may determine that the image is weakly classifiable due to the condition. The processor may automatically transmit a control signal to adjust the condition (e.g., transmit a control signal to a smart lightbulb to increase the lighting around the object prior to taking new photos) in order to make the image strongly classifiable. Alternatively, or additionally, the processor may transmit an alert to the user, or to an operator, indicating a reason why the image is weakly classifiable. Such an alert may include a recommendation on how to make the image strongly classifiable. Alternatively, the processor may automatically adjust the image (e.g., by applying a filter to improve brightness of the image) to make the image strongly classifiable. Rather than taking action when an image is weakly classifiable, the processor may simply exclude that image from training data.

As new images are classified, the processor may compare the classifications of the new images, and attributes of the new images themselves, to classifications and attributes of images in the visual guide. Responsive to detecting a mismatch in such a comparison, the processor may determine that an image in the visual guide is incorrectly labeled. Where an image is incorrectly labeled, the processor may alert the user about the incorrect labeling, or may correct the label.

In an embodiment, the processor may use consistency scores for the images based on the consistency of the labeling of the classifiers to determine whether to populate an image as training data for a machine learning classifier. For example, responsive to identifying an image that has at least a threshold consistency score (in any manner defined above) for a given classification, the processor may automatically add the image to a corpus of training data for that classification. Yet further, the processor may determine whether the amount of training data corresponding to estimated image column 370 is satisfied as images are added to the corpus. Responsive to determining that a sufficient amount of training data has been identified, the processor may train the classifier to detect the corresponding classification in new images using the training data. Thereafter, as new images are received, rather than assign (or enable a user to assign, as will be discussed with respect to FIG. 8) the new images to human classifiers for classification, the processor may automatically use the classifier to determine whether that classification is present in the image.

In order to facilitate the building of a spectrum for a given classification, human classifiers may be prompted to label various cases. For example, for image 612, in addition to indicating that a hole that is not defective is present in an image, the inspectors may indicate that the hole is less than perfect, but nonetheless not defective. The inspectors may do so by being prompted by the processor with a spectrum of options, such as "no defect," "minor defect but OK," "minor defect but NG," and "large defect and NG". The user may define the spectrum of options as part of the framework using user interface 300. The processor may train a classifier for each option of the spectrum of options in order to learn how to classify cases where minor defects that do or do not cause an object to be NG are classifiable. In an embodiment, the processor may automatically add one or more images to an image spectrum. For example, where insufficient coverage exists for an option of a spectrum of options, where the processor determines that sufficient coverage has come into being based on a consistency analysis of new images, the processor may populate an image into the spectrum for that option.

FIG. 7 shows an exemplary user interface for reviewing the progress of a task, in accordance with one embodiment. User interface 700 lists projects defined by the user, such as the 72 pin socket project for which a visual guide was created. User interface 700 also includes various parameters of tasks for one or more projects, such as which project the task corresponds, whether a data set was selected automatically or by the user, how many images are to be inspected as part of a task, which human classifiers are assigned to the task, the status of the task, and a date associated with the status.

User interface 700 may include new task option 710. Responsive to detecting selection of new task option 710, the processor may generate for display a user interface for configuring the new task, as will be discussed in further detail with respect to FIG. 8. User interface 700 may also include result option 720. Responsive to detecting selection of result icon 720, the processor may generate for display the results of a task, as will be described in further detail with respect to FIG. 9. The processor may selectively generate for display result icon 720 responsive to detecting that the task has achieved a status of "completed," and may omit icon 720 when the task is in progress.

FIG. 8 shows an exemplary user interface for creating parameters for a new classification task, in accordance with one embodiment. User interface 800 is depicted as an overlay on top of user interface 700, but this is merely exemplary; user interface 800 may be in a stand-alone user interface. In an embodiment, the processor automatically populates known aspects of the new classification task, such as the project name. As depicted, because user interface relates to tasks for the project "72 pin socket," the processor may populate the project name in user interface 800 as "72 pin socket."

User interface 800 may prompt the user to enter the number of images to be classified in the new task. User interface 800 may include autoselect option 810, and customize option 811. Responsive to detecting a selection by the user of autoselect option 810, the processor may select, from a corpus of new images, enough images to satisfy the specified number of images for the classification task. Responsive to detecting selection by the user of customize option 811, the processor may generate for display a directory of images from which the user may select images for inclusion in the classification task.

User interface 800 also includes assign inspectors section 820. In an embodiment, the processor may generate for display a directory of human classifiers, from which the user may select one or more human classifiers for performing the task. The user may dictate restrictions on human classifiers that can be assigned to a task. For example, as depicted, the user may create a rule that requires an odd number of human classifiers be assigned to a task, and may further create a rule that requires a same number of users of certain qualifications (e.g., one qualified human classifier for every human classifier that is not a qualified human classifier that is assigned to a task). The processor may generate for display indicia of such rules to a person assigning the task.

FIG. 9 shows an exemplary user interface including the results of a completed task, in accordance with one embodiment. In an embodiment, user interface 900 may be depicted responsive to detecting a selection of result icon 720. User interface 900 may optionally include display of information about the classification task that is also displayed in user interface 700. User interface 900 may be displayed as an overlay on top of user interface 700, or in a standalone user interface.

User interface 900 includes results interface 910. Results interface 910 includes various parameters about the selected task. Exemplary parameters depicted within results interface 910 include "overkill," "escape," "precision," and "recall." These exemplary parameters are computed based on a number of true positives, false positives, true negatives, and false negatives that occurred during the task. True positives and true negatives refer to accurate labels being applied for binary classifications (e.g., a true positive is a correct label of "OK" being applied, and a true negative is a correct label of "NG" being applied). False positives and false negatives refer to inaccurate labels being applied for binary classifications (e.g., a false positive is an incorrect label of "OK" being applied, and a false negative is an incorrect label of "NG" being applied). This concept may be expanded to non-binary classification schemes as well. The processor may determine precision by dividing the number of true positives by the sum of the number of true postives and the number of false positives. The processor may determine the recall by dividing the number of true positives by the sum of the number of true positives and the number of false negatives. The processor may determine the overkill by dividing the number of false positives by the sum of the number of false positives and the number of true negatives. The processor may determine the escape by dividing the number of false negatives by the sum of the number of true positives and the number of false negatives. While not depicted, results interface 910 may include accuracy information for individual human classifiers. The processor may compile accuracy of individual human classifiers. The processor may determine, based on the accuracy of a given individual human classifier exceeding a threshold accuracy over a threshold amount of tasks, that the human classifier is a qualified human classifier.

In an embodiment, the processor may use training data to benchmark an accuracy of human classifiers. The processor may determine a measure (e.g., average, median, etc.) of how often qualified users correctly classify an image, and may determine a measure of how often a given user correctly classifies the image, to measure the accuracy of that given user. The processor may alternatively determine how often the machine learning model classifies a new image, and use that as a benchmark to measure the accuracy of a given user.

What is claimed is:

1. A computer-implemented method for creating a visual guide for developing training data for a classification of images, the training data comprising images tagged with labels for the classification of the images, the method comprising:
   prompting a user to define a framework for the classification, the framework, when defined, including example images that are each paired with one or more example labels;
   for an initial set of images within the training data, prompting qualified human classifiers to locate the images within the framework based on the example images and to tag the images with labels for the classification based on the example labels;
   determining whether the tagged images have consistent labels; and
   responsive to determining that the tagged images have consistent labels, adding additional images to the training data by:
      providing a visual guide for human classifiers, the visual guide comprising tagged images arranged according to their locations within the framework and according to their labels; and
      prompting human classifiers to tag the additional images with labels for the classification, according to the visual guide, wherein the training data is used to train a machine learning model to automatically tag further images with labels according to the framework.

2. The computer-implemented method of claim 1, further comprising:
   determining whether an image in the initial set is weakly classifiable; and
   responsive to determining that the image is weakly classifiable, excluding that image from the training data.

3. The computer-implemented method of claim 1, further comprising:
   determining whether an image in the initial set is weakly classifiable; and
   responsive to determining that the image is weakly classifiable, modifying that image to be strongly classifiable.

4. The computer-implemented method of claim 1, further comprising:
   determining whether the label for a tagged image in the initial set is incorrect; and
   responsive to determining that the label is incorrect, excluding that image from the training data.

5. The computer-implemented method of claim 1, further comprising:
   determining whether the label for a tagged image in the initial set is incorrect; and
   responsive to determining that the label is incorrect, correcting the label for that image.

6. The computer-implemented method of claim 1, wherein determining whether the tagged images have consistent labels comprises:
   determining, for tagged images that are similar to each other, whether those tagged images also have similar labels.

7. The computer-implemented method of claim 1, wherein determining whether the tagged images have consistent labels comprises:
   determining, for tagged images that have similar labels, whether those tagged images are also similar to each other.

8. The computer-implemented method of claim 1, further comprising:
   determining whether the tagged images provide sufficient samples across the framework; and
   responsive to determining that the tagged images do not provide sufficient samples, prompting to provide additional tagged images in regions of the framework that have insufficient samples.

9. The computer-implemented method of claim 1, wherein the visual guide comprises a spectrum of tagged images spanning a range of values for the labels.

10. The computer-implemented method of claim 1, wherein the classification is a binary classification having two possible labels.

11. The computer-implemented method of claim 1, further comprising:
    using the training data to benchmark an accuracy of human classifiers.

12. The computer-implemented method of claim 1, wherein the visual guide dynamically adapts by giving more weight to newer images compared to older images.

13. The computer-implemented method of claim 1, wherein the framework is amendable to include new types of objects.

14. The computer-implemented method of claim 9, wherein the framework defines different groups, and the visual guide comprises different spectra for different groups within the framework.

15. The computer-implemented method of claim 9, further comprising:
    automatically placing a new image on the spectrum, based on a location of the new image within the framework and on the tagged images spanning the spectrum.

16. The computer-implemented method of claim 9, further comprising:
    automatically placing a new image on the spectrum, based on a location of the new image within the framework and rules for placing images in a spectrum of the location.

17. The computer-implemented method of claim 9, further comprising:
    automatically placing a new image on the spectrum, based on a location of the new image within the framework and a similarity of the new image relative to the tagged images spanning the spectrum.

18. The computer-implemented method of claim 10, wherein the two possible labels correspond to an image having a defect or not having a defect.

19. The computer-implemented method of claim 11, wherein the human classifiers are benchmarked against a machine learning model trained using the training data.

* * * * *